Figure 1:
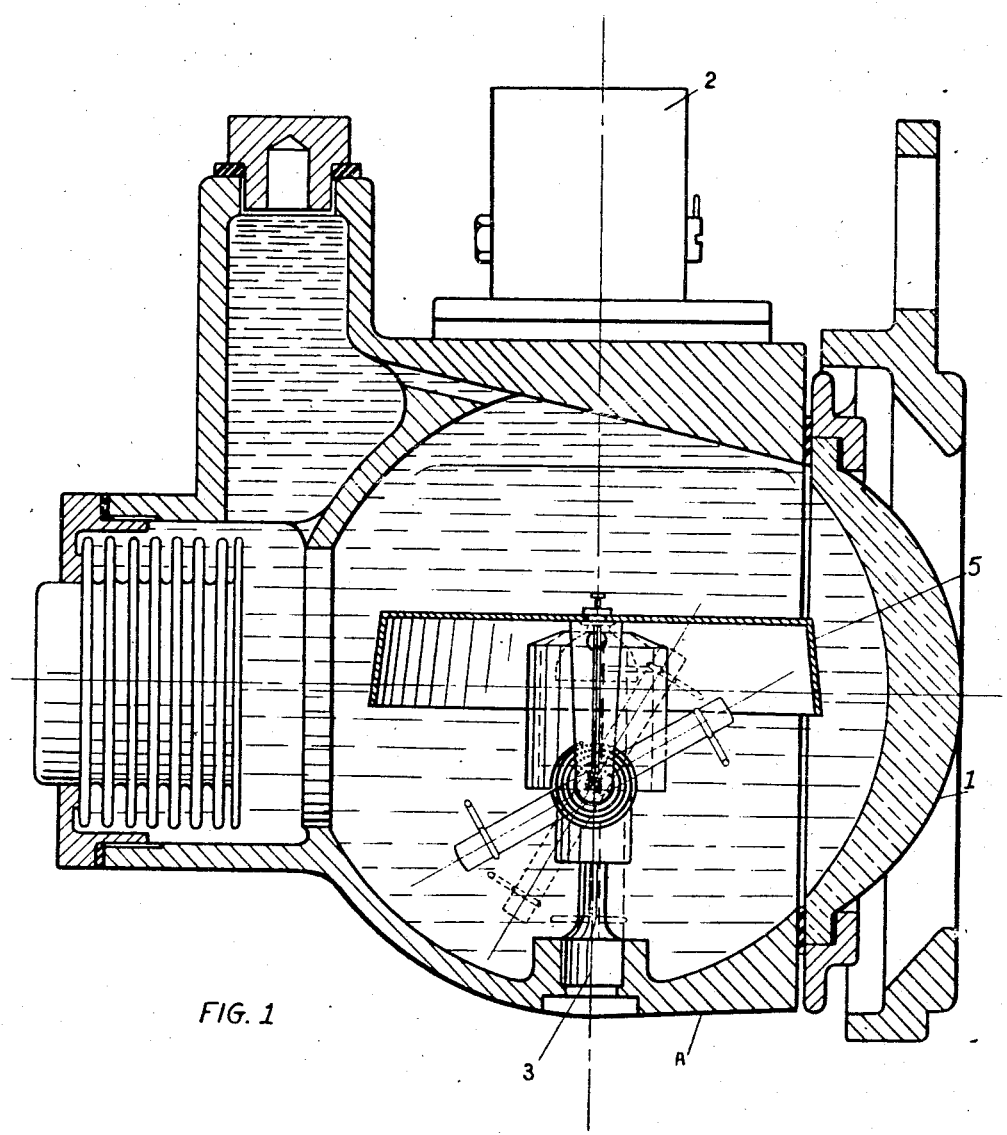

June 13, 1939.   P. KOLLSMAN   2,161,870
AUTOMATIC MEANS FOR VARYING COMPASS CARD OSCILLATION
Filed May 17, 1933   2 Sheets-Sheet 1

June 13, 1939.　　　P. KOLLSMAN　　　2,161,870
AUTOMATIC MEANS FOR VARYING COMPASS CARD OSCILLATION
Filed May 17, 1933　　　2 Sheets-Sheet 2

UNITED STATES PATENT OFFICE 2,161,870

AUTOMATIC MEANS FOR VARYING COMPASS CARD OSCILLATION

Paul Kollsman, New York, N. Y.

Application May 17, 1933, Serial No. 671,548

18 Claims. (Cl. 33—223)

One difficulty in connection with the use of compasses on airships and other mounts subject to decided changes of direction is the vexatious oscillation of the compass card or other movable direction indicating element. The oscillations are caused by torques acting in opposite directions on the rotatable directional element having inertia. Every one is familiar with the troublesome oscillation of the ordinary magnetic compass needle which, under agitation, is practically never at rest, but oscillates clockwise and counterclockwise, to east and to west from a true north indication.

In connection with airship compasses, a damping liquid is employed to damp this vexatious oscillation of the compass card. The more the damping, however, the less sensitive is the compass and the greater its lag before assuming a true directional indication. The situation, therefore, is one in which oscillation of a troublesome degree has, before my invention, been one of the things tolerated.

The broad object of my invention is to minimize this oscillation while, at the same time, preserving the normal sensitivity of the compass.

A further object of my invention is automatically to preserve substantially uniform the tendency to oscillate under varying conditions.

It is a further object of my invention to provide satisfactory means for accomplishing the above functions. Objectively, I employ various methods and means chosen with particular regard to the change of conditions tending to disturb the normal period of oscillation. Such methods and means are also disclosed in my copending divisional application, Serial No. 156,551, filed July 30, 1937.

It is still a further object automatically to vary the torques tending to set up oscillations during the time of and in response to disturbing influence tending to start the oscillation and also to restore to normal magnitude the torques after the disturbing oscillation creating condition has ceased to exist.

I appreciate that the pivoted assemblage of a compass is subjected to an oscillation retarding force usually by means of immersing it in a viscous liquid while the directional urge imparted to this pivoted assemblage is the torque exerted by a coupling of the direction finding force within this assemblage with an external force, such as the earth's magnetism. I also appreciate the fact that the period of oscillation of the pivoted assemblage is a function of this force couple or torque and the moment of inertia of the pivoted assemblage.

In carrying into effect the objects of my invention, one instance has to do with a lowering of temperature when the ship attains a great altitude. This usually increases the viscosity of the damping liquid. When this viscosity increases, I may tend to maintain normal oscillation by increasing the oscillation producing torque, or by reducing the grip of the damping liquid upon the pivoted assemblage. I propose to do this in either of two ways. One way is thermostatically to control the position of the directional force means carried by the pivoted assemblage so that its directional force with respect to the earth's magnetic field increases, and this I do by actually moving this means relatively to the assemblage and the direction of the earth's magnetism. A second way which I contemplate is to reduce the viscous engagement between the pivoted assemblage and the damping liquid as viscosity increases. For this I contemplate as a simple means thermostatically controlled fins attached to this pivoted assemblage.

More generally, it is an object of my invention to avoid irritation of an observer by a varying degree of the oscillation of the directing pivoted assemblage of a compass.

The above and further objects and advantages of my invention will better be understood from the following description in connection with the accompanying drawings showing for purely illustrative purposes embodiments of this invention. It is to be understood, however, that the description is not to be taken in a limiting sense, the scope of the invention being defined in the appended claims.

Figure 2:
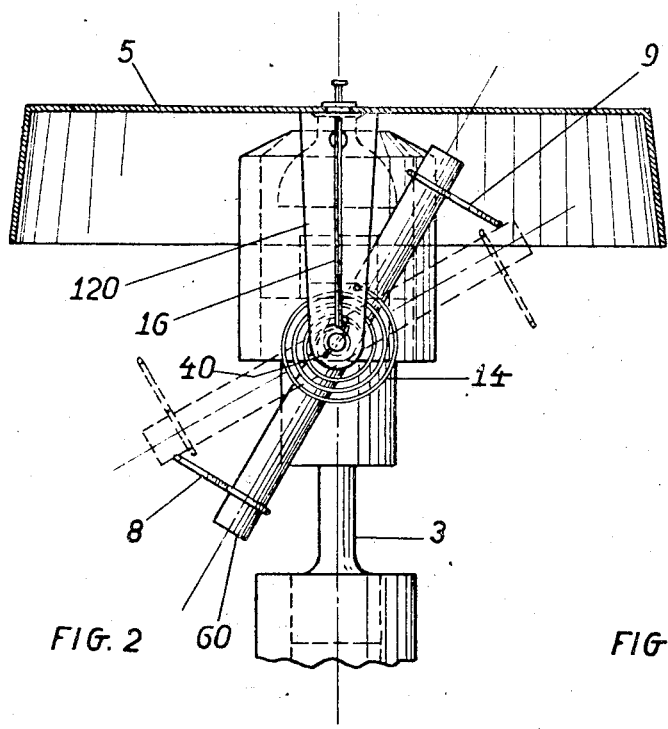
Figure 3:
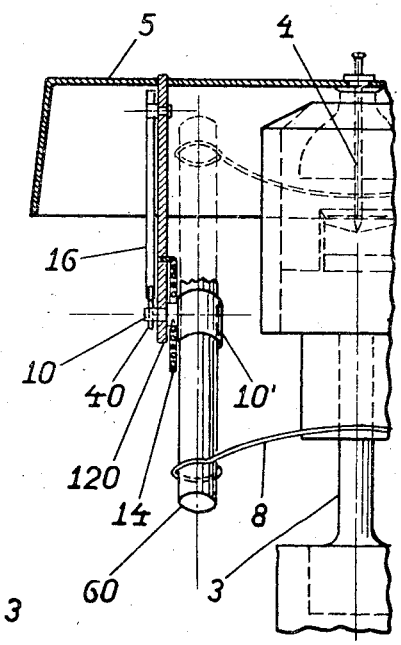

In the drawings, Fig. 1 is a vertical cross-section of a magnetic compass embodying my invention; Fig. 2 is a vertical cross-section drawn to an enlarged scale of the pivoted assemblage within the compass of Fig. 1 showing thermostatic control; Fig. 3 is a view at right angles to Fig. 2 and with parts broken away showing the same embodiment as in Fig. 2; and Fig. 4 is a bottom plan view of the pivoted assemblage of a compass provided with means for varying the grip of the fluid damping means.

Embodiment of Figs. 1, 2 and 3

Any convenient, preferably liquid filled casing or mount A providing the vision window 1 and with or without a deviation compensator 2 is adapted to be mounted upon the carrier, such as an aeroplane. In the embodiments shown, any approved post or pillar construction 3 serves to pivot the pivoted assemblage as by means of the pivot pin 4. By pivoted assemblage I mean all the parts which move in response to the external direction imparting force. In the present embodiment they comprise the compass card spider 5 and local directional magnets 60. The bar magnets 60 are locally framed one to the other by the arcuate cross-wires 8 and 9 which grasp the opposite ends of the respective bar magnets so that the magnets 60 and bridging wires 8 and 9 form a swiveling assemblage mounted on the trunnions 10 formed by collars 10' to swivel in the lower ends of the bracket bars 120 fixed to the compass card spider 5. Each of these trunnions are provided with pins 40 and which are forced against the lower ends of the bi-metal thermostat arms 16 and by the spiral springs 14. The normal position for the swiveled assemblage in this embodiment may be that shown in the full lines of Figs. 2 and 3, that is, for normal viscosity of the damping liquid. When, on account of a lowering of the temperature, the viscosity of the damping liquid increases, the lower ends of the bi-metal thermostats 16 move to the right as viewed in Fig. 2, working against the spiral spring 14 to swing the swiveled mechanism, say, into the dash line position shown in Fig. 2 more nearly in parallelism with the horizontal component of the earth's magnetism and so as to increase the magnetic torque tending to oscillate the pivoted assemblage.

Figure 4:
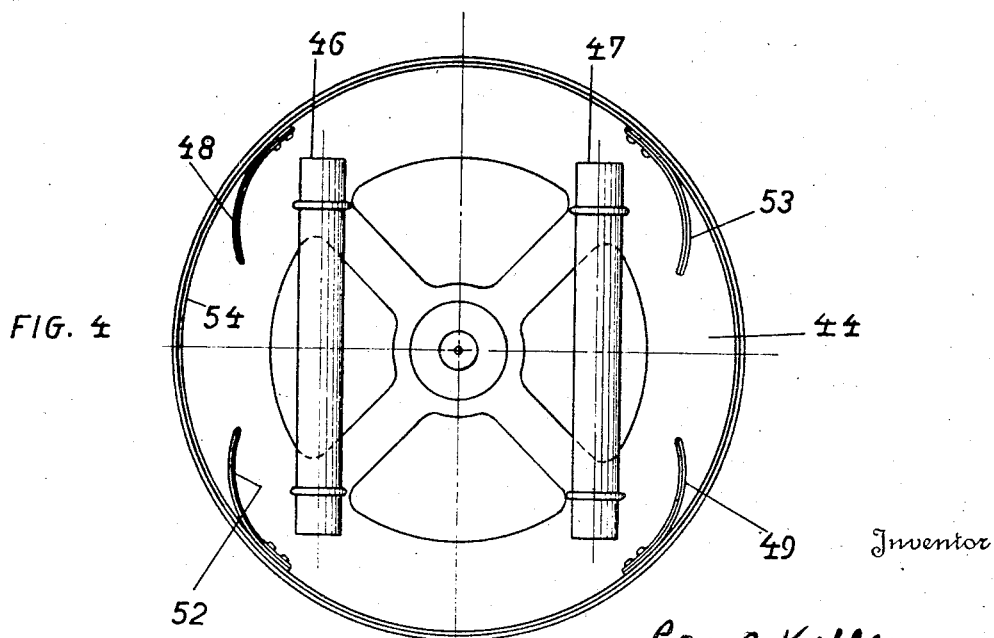

Embodiment of Fig. 4

This figure shows a bottom view of any appropriate compass card spider 44, the direction finding torque for which is imparted by the magnets 46 and 47 secured thereto. Fixed to any appropriate part of this pivoted assemblage are two pairs 48 and 49 and 52 and 53 of thermostat fins of the bi-metal type. It is to be understood that this pivoted assemblage is adapted to be housed in any suitable casing such as that shown in Fig. 1 and to be immersed in damping liquid. As the temperature decreases, causing an increase in the viscosity of the liquid, the design and bi-metal character of the fins 48, 49 and 52, 53 cause them to close in towards the rim 54 of the pivoted assemblage and therefore reduce the grip of the damping liquid upon the pivoted assemblage. It should be noted that these pairs of fins are directed in opposite directions so that the damping and the variation of the damping shall be uniform as between a clockwise and a counter-clockwise oscillation. In functioning, the oscillation producing force or torque is not controlled, but the damping force is varied or compensated in its effectiveness to produce damping of the oscillations, and this is accomplished automatically in response to a change in temperature.

Obviously the present invention is not restricted to the particular embodiments herein shown and described. Moreover, it is not indispensable that all of the features of this invention be used conjointly since they may advantageously be used in various combinations and subcombinations.

What is claimed is:

1. In a compass, a mounting; a direction indicating assemblage pivoted on said mounting and possessing a moment of inertia about its pivoting axis and a reactive force means reacting against any rotational deviation of said assemblage away from the direction of maximum coupling effect of an external fixed directing force, whereby any transient variation in the force torque exerted upon said assemblage tends to set up oscillations thereof; viscous damping means, the damping effect of which varies inversely with temperature, for damping said oscillations; and automatic means responsive to a change in temperature tending to compensate against a change in viscosity of said damping means in its effect upon said oscillations by reducing the grip of said viscous damping means upon the said pivoted assemblage.

2. In a compass, a mounting; a direction indicating assemblage pivoted to said mounting and possessing a moment of inertia about its pivoting axis including a reactive force means reacting against any rotational deviation of said assemblage away from the direction of maximum coupling effect of an external fixed directing force, whereby any transient variation in the force torque exerted upon said assemblage tends to set up oscillations thereof; viscous damping means, the damping effect of which varies inversely with temperature, for damping said oscillations; and automatic means responsive to temperature change for lessening the oscillation damping engagement of said viscous means with said assemblage as viscosity increases and vice versa.

3. In a compass, a mounting; a direction indicating assemblage pivoted to said mounting and possessing a moment of inertia about its pivoting axis and a reactive force means reacting against any rotational deviation of said assemblage away from the direction of maximum coupling effect of an external fixed directing force, whereby any transient variation in the force torque exerted upon said assemblage tends to set up oscillations thereof; viscous damping means, the damping effect of which varies with temperature, for damping said oscillations; and automatic means responsive to a change in temperature for increasing the directional force torque of said assemblage as the viscosity of said damping means increases and vice versa.

4. In a compass a pivot; a member supported by said pivot for rotation in azimuth; magnetic means connected thereto to exert, upon deviation of said member from a predetermined position in azimuth, a torque on said member for returning said member to said predetermined position; means exerting a torque on said member in opposition to the return movement; and an element responsive to changes in temperature of said compass arranged to increase and decrease, in response to said changes in temperature, the torque of one of said means exerted upon said member.

5. In a compass a pivot; a member supported by said pivot for rotation in azimuth; magnetic means connected thereto to exert, upon deviation of said member from a predetermined position in azimuth, a torque on said member for returning said member to said predetermined position; means exerting a torque on said member in opposition to the return movement; and an element responsive to changes in temperature of said compass arranged to increase and decrease, in response to said changes in temperature, the torque of said magnetic means exerted upon said member.

6. In a compass a pivot; a member supported by said pivot for rotation in azimuth; magnetic means connected thereto to exert, upon deviation of said member from a predetermined position in azimuth, a torque on said member for returning said member to said predetermined position; means exerting a torque on said member in opposition to the return movement; and an element responsive to changes in temperature of said compass arranged to increase, and decrease in response to said changes in temperature, the torque of said return movement opposing means exerted upon said member.

7. In a compass a member mounted for rotation in azimuth; a magnetic element mounted on said member and exerting, upon deviation of said member from a predetermined position in azimuth, a torque on said member for returning said member to said predetermined position; damping means exerting on said member a torque in opposition to such return movement; and an element responsive to changes in temperature of said compass and arranged to increase and decrease, in response to said changes in temperature, the torque of said magnetic element exerted on said member.

8. In a compass a member mounted for rotation in azimuth; a magnetic element mounted on said member and exerting, upon deviation of said member from a predetermined position in azimuth, a torque on said member for returning said member into said predetermined position; damping means including a damping fluid exerting on said member a torque in opposition to such return movement; and an element responsive to changes in temperature of said compass and arranged to increase and decrease, in response to said changes in temperature, the torque of said magnetic element exerted on said member.

9. In a compass a member mounted for rotation in azimuth; a magnetic element mounted on said member for tilting movement relatively to said member about an axis substantially normal to the magnetic axis of said element; damping means exerting on said member a torque opposing movements of said member in azimuth; and an element responsive to changes in temperature of said compass connected to adjust the position of said magnetic element relatively to said member about said tilting axis, whereby the directional force of said element with respect to the earth's magnetic field is increased and decreased in response to said changes in temperature.

10. In a compass a member mounted for rotation in azimuth; a magnetic element mounted on said member for tilting movement relatively to said member about an axis substantially normal to the magnetic axis of said element; damping means including a damping fluid exerting on said member a torque opposing movements of said member in azimuth; and an element responsive to changes in temperature of said compass connected to adjust the position of said magnetic element relatively to said member about said tilting axis, whereby the directional force of said element with respect to the earth's magnetic field is increased and decreased in response to said changes in temperature causing a variation in viscosity of said damping fluid.

11. In a compass a member mounted for rotation in azimuth; a magnetic element mounted on said member for tilting movement relatively to said member about an axis substantially normal to the magnetic axis of said element; damping means including a damping fluid exerting on said member a torque opposing movements of said member in azimuth; and a bimetallic element responsive to changes in temperature of said fluid and connected to adjust the position of said magnetic element relatively to said member about said tilting axis, whereby the directional force of said element with respect to the earth's magnetic field is increased and decreased in response to said changes in temperature causing a variation in viscosity of said damping fluid.

12. In a compass a member mounted for rotation in azimuth; a magnetic element mounted on said member for tilting movement relatively to said member about an axis substantially normal to the magnetic axis of said element; damping means exerting on said member a torque opposing movements of said member in azimuth; and means connected to adjust the position of said magnetic element relatively to said member about said tilting axis; whereby the directional force of said element with respect to the earth's magnetic field is increased and decreased and the period of oscillation of the compass made adjustable.

13. In a compass a member mounted for rotation in azimuth; a magnetic element mounted on said member for tilting movement relatively to said member about an axis substantially normal to the magnetic axis of said element; damping means including a liquid exerting on said member a torque opposing movements of said member in azimuth; and means connected to adjust the position of said magnetic element relatively to said member about said tilting axis; whereby the directional force of said element with respect to the earth's magnetic field is increased and decreased and the period of oscillation of the compass made adjustable.

14. In a compass a pivot; a member supported by said pivot for rotation in azimuth; a magnetic element mounted on said member tending, upon deviation of said member from a predetermined position in azimuth, to return said member to said predetermined position by a torque in azimuth; damping means including a fluid tending to oppose movements in azimuth of said member by a torque exerted on said member upon movements of said member in azimuth; and means for increasing and decreasing the magnitude of the torque exerted on said member by said damping means, whereby the period of oscillation of the compass is adjustable.

15. In a compass a member mounted for rotation in azimuth; a magnetic element mounted on said member thereby tending to maintain said member fixed in azimuth; damping means including a damping fluid exerting on said member a torque opposing movements of said member in azimuth; and means responsive to changes in temperature of said fluid and connected to increase and decrease, in response to such changes in temperature, the directional force of said element with respect to the earth's magnetic field, whereby changes in viscosity of said damping fluid incidental to changes in temperature may be compensated.

16. In a compass a pivot; a member supported by said pivot for rotation in azimuth; a magnetic element mounted on said member and exerting, upon deviation of said member from a predetermined position in azimuth, a torque on said member for returning said member to said predetermined position; damping means exerting on said member a torque in opposition to such return movement; and an element responsive to changes in temperature connected to increase and decrease, in response to such changes in temperature, the torque of said damping means exerted on said member.

17. In a compass a member mounted for rotation in azimuth; a magnetic element mounted on said member and exerting, upon deviation of said member from a predetermined position in azimuth, a torque on said member for returning said member to said predetermined position; damping means including a damping fluid and damping surfaces projecting from said member into said fluid and exerting on said member a torque in opposition to such return movement, said surfaces being adjustable relatively to said member in response to changes in temperature of said fluid, whereby changes in the period of oscillation of the compass due to changes in viscosity of said damping fluid, incidental to changes in temperature, may be compensated.

18. In a compass a member mounted for rotation in azimuth; a magnetic element mounted on said member and exerting, upon deviation of said member from a predetermined position in azimuth, a torque on said member for returning said member to said predetermined position; damping means including a damping fluid and bimetallic adjustable damping vanes projecting from said member into said fluid and exerting on said member a torque in opposition to such return movement, whereby changes in the period of oscillation of the compass due to changes in viscosity of said damping fluid, incidental to changes in temperature, may be compensated.

PAUL KOLLSMAN.